United States Patent [19]
Greatbatch
[11] 3,718,909
[45] Feb. 27, 1973

[54] RATE CONTROLLER AND CHECKER FOR PULSE GENERATOR MEANS

[75] Inventor: Wilson Greatbatch, Clarence, N.Y.

[73] Assignee: Medtronic, Inc., Minneapolis, Minn.

[22] Filed: June 18, 1970

[21] Appl. No.: 47,198

[52] U.S. Cl.............340/167 A, 128/419 P, 128/422, 307/234, 325/66, 328/112, 329/106, 331/179

[51] Int. Cl...............................................A61n 1/36

[58] Field of Search...128/419 P, 421, 422; 331/177, 331/179; 340/167 A; 325/38, 43, 66, 391, 392; 307/234; 328/112; 329/106

[56] References Cited

UNITED STATES PATENTS

| | | | |
|---|---|---|---|
| 2,297,618 | 9/1942 | Grimes et al. | 325/391 |
| 3,127,895 | 4/1964 | Kendall et al | 331/179 X |
| 3,098,212 | 7/1963 | Creamer, Jr. | 340/167 A X |
| 3,225,348 | 12/1965 | Gilman | 331/179 X |
| 3,139,539 | 6/1964 | Hewett | 307/234 X |

*Primary Examiner*—William E. Kamm
*Attorney*—Irving S. Rappaport, Donald R. Stone and Lew Schwartz

[57] ABSTRACT

A remotely-operated control for and electrical pulse generating means, such as a cardiac pacer including timing means controlling the generation of pulses and signal responsive means for resetting the timing means in response to a ventricular electrical signal. A remote, portable transmitter selectively generates a plurality, preferably about three, radio frequency signals having different envelope durations, the signal of longest duration being a continuous or carrier wave signal. Coupled to the pulse generator or pacer is a circuit responsive to the radio frequency signals which rectifies, detects and filters them to produce corresponding command signals. Two of the command signals corresponding to the relatively shorter r.f. signals can be applied to the pacer oscillator in a manner increasing or decreasing the rate of pulse generation. The command corresponding to the continuous r.f. signal can be utilized to temporarily inhibit operation of the pacer signal responsive means to check the viability of this function. In addition, this command signal can be applied to a switching means to reduce the capacitance in the timing means to in turn reduce the width of the pacer output pulse for testing the patient's response to reduced energy pulses. In addition, this same command signal can be applied to a semi-conductor switching means for reducing the gain of the amplifier in the ventricular signal responsive means for testing the sensitivity thereof.

6 Claims, 2 Drawing Figures

INVENTOR.
Wilson Greatbatch
BY
Christel & Bean
ATTORNEYS.

INVENTOR
Wilson Greatbatch
BY
Christel & Bean
ATTORNEYS.

RATE CONTROLLER AND CHECKER FOR PULSE GENERATOR MEANS

BACKGROUND OF THE INVENTION

This invention relates to the wireless remote control of the output rate and mode of operation of a pulse generator and, more particularly, to such control of the rate of pulse generation and the function mode.

One area of use of the present invention is in the external control of the free-running rate, testing of stimulation and R-wave sensitivity safety margins, and establishing the viability of the demand function of an implanted demand cardiac pacer, although the principles of the invention may be applied to the control of various remote pulse generators. A cardiac pacer of the non-synchronous type is shown in U.S. Pat. No. 3,057,356 and it permits innocuous, painless, long-term cardiac stimulation at low power levels by utilizing a small, completely implanted transistorized and battery-operated pacer connected via flexible electrode wires directly to the myocardium or heart muscle. Such a non-synchronous pacer, while providing fixed-rate stimulation not automatically changed in accordance with the body's needs, has proven effective in alleviating the symptoms of complete heart block. A non-synchronous pacer, however, has the possible disadvantage of competing with the natural, physiological pacer during episodes of normal sinus conduction.

An artificial pacer of the demand type has been developed wherein the artificial stimuli are initiated only when required and subsequently can be eliminated when the heart returns to the sinus rhythm. Such a demand pacer is shown in my U.S. Pat. No. 3,478,746 issued Nov. 18, 1969 and entitled "CARDIAC IMPLANTABLE DEMAND PACEMAKER." The demand pacer solves the problem arising in non-synchronous pacers by inhibiting itself in the presence of ventricular activity but by coming "on line" and filling in missed heartbeats in the absence of ventricular activity.

A problem with implantable demand pacers heretofore available is that if the patient's heart is in sinus rhythm, it is impossible to ascertain whether the pacer is working properly in the demand mode or whether the device has completely failed. Another problem is that there is no way to temporarily increase or decrease the rate at which these stimulating pulses are generated without surgical intervention. Still another problem is the great difficulty in establishing the battery life remaining, in detecting a failing electrode, and in establishing an adequate R-wave sensitivity safety margin in an implanted demand pacer.

Some implantable cardiac pacers presently constructed have a rate overdrive capability but do not adequately check the viability of the demand function. Other devices are provided with a magnetic reed switch arrangement which can deactivate the demand amplifier for the purpose of checking the demand function, but are lacking in a rate overdrive capability. Presently available systems for testing stimulation safety margin have need for improvement from the standpoint of precision and controllability.

SUMMARY OF THE INVENTION

It is, therefore, an object of this invention to provide wireless remote control of the rate of pulse generation and of various modes of operation of a pulse generator.

It is a more particular object of the present invention to provide a wireless remote control of the rate of pulse generation and of various modes of operation of a pulse generator.

It is a more particular object of this invention to provide an external control for a pulse generator for temporarily accelerating or slowing the rate of pulse generation and for ascertaining whether the pulse generator is functioning properly in a particular mode, both without surgical intervention.

It is a further object of this invention to provide an external control for a pulse generator for testing the safety margin in terms of remaining battery life and electrode condition and for testing the control sensitivity safety margin, both without surgical intervention.

The present invention provides a remotely-operated control for an electrical pulse generator, such as an artificial cardiac pacer of the implanted demand type, including a radio transmitter capable of generating a plurality of signals, for example, about three, having different envelope durations. A control means is operatively connected to the pulse generator or pacer and itself produces corresponding command signals in response to reception of the transmitted signals. Two of the command signals, which correspond to the r.f. signals of relatively short envelope durations, are utilized to increase or decrease the rate of output pulse generation. A third command signal corresponding to the r.f. signal of relatively much longer envelope duration, such as a continuous carrier wave signal, is utilized to temporarily inhibit the demand function of the pacer to check the viability of that function. Alternatively, this same command signal can be utilized to modify the energy of the pulses formed whereby the stimulation safety margin can be ascertained. In addition, this same command signal can be applied to the demand amplifier portion of the pacer in a manner permitting determination of the sensitivity safety margin thereof.

The foregoing and additional advantages and characterizing features of the present invention will become clearly apparent upon a reading of the ensuing detailed description of two illustrative embodiments thereof, together with the included drawing depicting the same.

BRIEF DESCRIPTION OF THE DRAWING FIGURES

FIG. 1 is a schematic diagram of a remotely-operated control for an electrical pulse generator, such as an artificial cardiac pacer, constructed in accordance with one embodiment of the present invention; and FIG. 2 is a schematic diagram of a remotely-operated control for an artificial cardiac pacer constructed in accordance with a second embodiment of the present invention.

DETAILED DESCRIPTION OF THE ILLUSTRATED EMBODIMENTS

Figure 1:
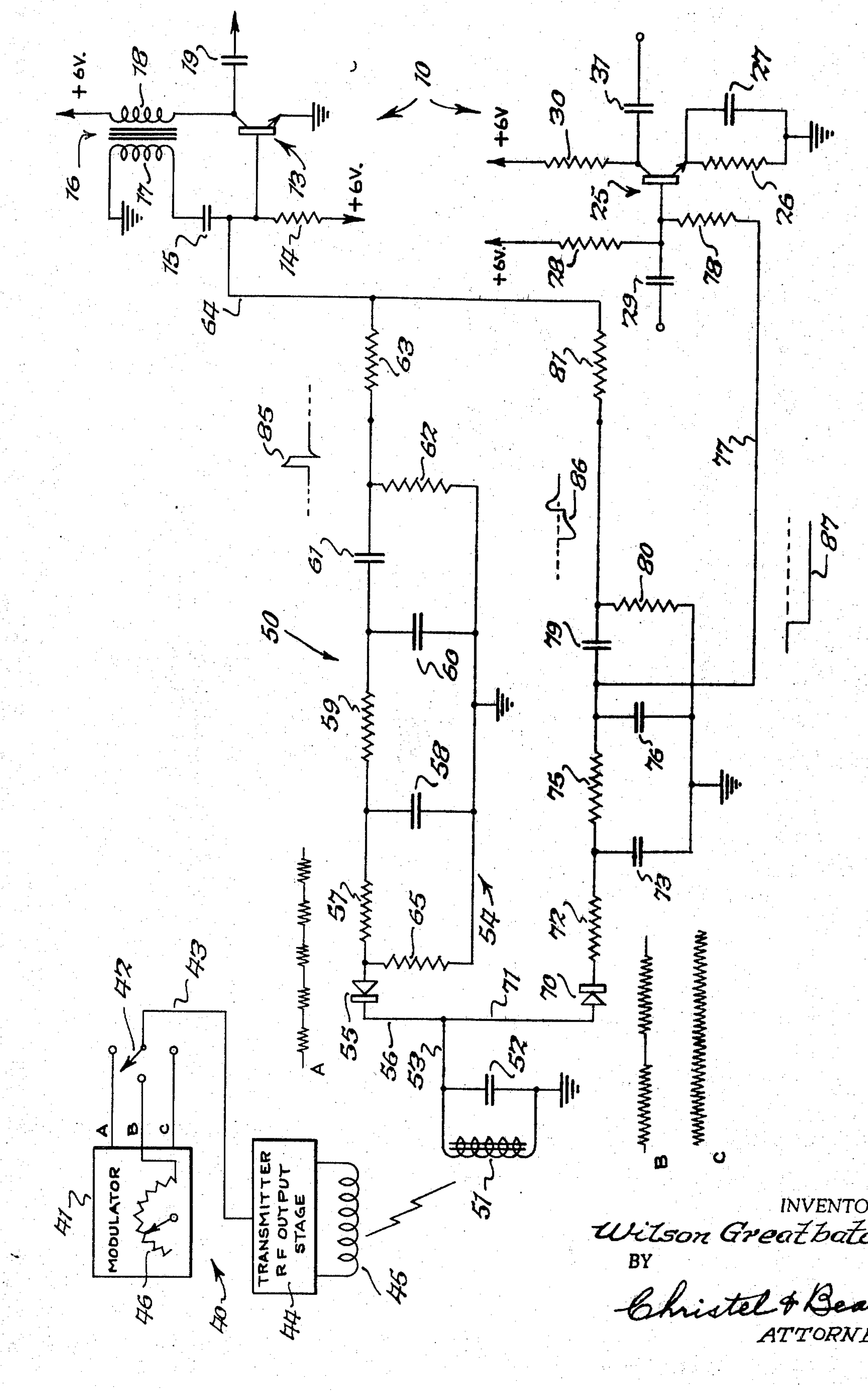

A pulse generator to be controlled is indicated generally at 10 in FIG. 1, and according to a preferred mode of the present invention comprises a cardiac pacer of the demand type. Pulse generator 10 includes an oscillator portion comprising an oscillator transistor 13, the emitter terminal of which is connected to ground. The base terminal of oscillator transistor 13 is connected through a resistor 14 to a source of positive bias voltage (not shown) and through a timing capacitor 15 to a transformer 16, in particular to one end of the secondary winding 17 thereto The other end of secondary winding 17 is connected to ground. The primary winding 18 of transformer 16 is connected between a source of positive bias voltage (not shown) and the collector terminal of oscillator transistor 13. The collector terminal of transistor 13 also is coupled through a capacitor 19 to a suitable output stage.

In operation, current flowing through resistor 14 charges timing capacitor 15 to turn on transistor 13 after a pre-determined time. This, in turn, provides a path for the flow of current through transformer primary winding 18 and the collector-emitter path of transistor 13 which flow induces a voltage in transformer secondary winding 17 to drive transistor 13 rapidly into saturation. Capacitor 15 then discharges and recharges partially in the opposite direction, transformer 16 saturates, and the field created about primary winding 18 begins to collapse immediately reversing the polarity of the voltage on secondary winding 17. This polarity reversal, in turn, drives the transistor immediately into cutoff, which terminates the output pulse. The output pulse rate is dependent upon values of capacitor 15 and resistor 14 which together constitute a timing means for the pulse generator. A more detailed description of the structure and operation of a similar pulse generating circuit included in a demand cardiac pacer is included in my afore-mentioned U.S. Pat. No. 3,478,746 and in my pending application Ser. No. 842,290 filed July 16, 1969, now U.S. Pat. No. 3,648,707, and entitled "MULTI-MODE CARDIAC PACEMAKER."

Pulse generating means 10 normally provides output pulses at a free-running rate determined by the magnitude of resistor 14 and capacitor 15. The pulse generating means to which the present invention is applicable also includes control means operable to reset the timing means whereby the pulses are generated at a different rate. In the case of an artificial cardiac pacer of the demand type such control means includes a signal responsive means coupled to a ventricular electrode and operatively connected to the pulse generating means, in particular to the timing means such as resistor 14 and capacitor 15 shown in the drawing. A ventricular signal, such as an R-wave produced in the heart, is sensed by such means, the signal is amplified therein, and the pulse generating means is inhibited or recycled so that no stimulating pulse will be sent to the heart by the artificial pacer. A section of such a signal responsive means is shown in FIG. 1 and includes an amplifier transistor 25, the emitter terminal of which is connected through the parallel combination of resistor 26 and capacitor 27 to ground. The base terminal of transistor 25 is connected through a resistor 28 to a source of positive bias voltage (not shown) and also is coupled through a capacitor 29 to a preceding stage of the signal responsive means. The collector terminal of transistor 25 is connected through a bias resistor 30 to the same source of positive bias voltage and the collector terminal also is coupled through a capacitor 31 to the output of the circuit. The output, in turn, is suitably coupled or transmitted to the pulse generator timing means, such as the combination of resistor 14 and capacitor 15 shown in the drawing. A more detailed description of the preferred circuit and the operation thereof for a signal responsive means in a cardiac demand pacer may be found in my afore-mentioned pending applications.

In accordance with this invention there is provided a remotely-operated control for pulse generating means 10 for increasing or decreasing the rate of pulse generation relative to the free-running rate and for testing the operation of generating means 10 in a particular mode or function. The remotely-operated control according to this invention includes, briefly, a remote transmitter for selectively generating first, second, and third radio frequency signals, and a control means responsive to the radio frequency signals and coupled to the portion of pulse generating means including oscillator 13 and the portion including amplifier 25. The control is operative to increase or decrease the rate of pulse generation in response to the reception of the first and second radio frequency signals, respectively, and to inhibit operation of the signal responsive means, in particular amplifier 25, in response to the reception of the third radio frequency signal and for the duration thereof.

Referring now to FIG. 1, there is shown at 40 a remote radio transmitter which preferably is of the hand-held type and capable of transmitting a highly localized radio field which is of an intensity higher than any other radio field a patient might normally encounter in his daily environment. Transmitter 40 includes a modulator stage 41 having output terminals designated A, B and C at which corresponding first, second and third radio frequencies signals are available. Selection of a particular one of the signals is accomplished by means of a switch 42, and the selected signal is transmitted over a line 43 to a transmitter output stage 44 having an antenna 45 connected to the output thereof. Transmitting antenna 45 is of the loop or coil type which is induction coupled with a receiver antenna in proximity to the pulse generator being controlled as will be explained in detail hereafter.

Transmitter 40 generates a first radio frequency signal comprising a train of pulses when switch 42 engages modulator output terminal A. This first signal comprises relatively short bursts of radio frequency energy, each pulse having a duration of about ten milliseconds or less and the pulses having a frequency of from about 100 kilocycles to about five megacycles. Transmitter 40 generates a second signal also comprising a train of pulses but in this instance the pulses have a relatively longer duration such as from about 100 to about 500 milliseconds. This signal is generated when switch 42 engages modulator output terminal B and the envelope duration is determined by the setting of potentiometer 46. Transmitter 40 thus operates in what might be termed a pulsitile mode for generating the first and second signals, which signals differ in terms of the duration of the envelope of the pulses. Transmitter 40 also operates in a continuous mode to generate a third radio frequency signal when switch 42 engages output terminal C of modulator 41. This signal is a continuously varying signal corresponding to the carrier wave generated in transmitter 40 at a frequency preferably of from about 100 kilocycles to about 5 megacycles.

The apparatus of the present invention further comprises a control means, indicated generally at 50, which is responsive to the radio frequency signals radiated by transmitter 40 and which is coupled to pulse generating means 10, in particular to oscillator 13 and to amplifier 25. Control means 50 comprise a ferrite antenna 51 which is in the form of a loop or coil adapted to be induction coupled to transmitting antenna 45. A capacitor 52 is connected across antenna coil 51 and the parallel combination of antenna coil 51 and capacitor 52 comprises a tuned circuit which is constructed to resonate at the carrier frequency of the transmitted signals which preferably is between 100 kilocycles and five megacycles. One terminal of capacitor 52 is connected to ground and the other terminal is connected through a lead 53 to the input of a detector 54 which includes first and second frequency responsive signal transmission paths. The first path includes a diode rectifier 55, the cathode of which is connected by a lead 56 to lead 53 and the anode of which is connected to one terminal of a resistor 57. The other terminal of resistor 57 is connected to one terminal of a capacitor 58, the other terminal of which is connected to ground. Diode 55 together with resistor 57 and capacitor 58 comprise a conventional diode detector which provides an output voltage across the combination of resistor 57 and capacitor 58. A filter comprising the series combination of a resistor 59 and a capacitor 60 is connected across capacitor 58, that is, one terminal of resistor 59 is connected to capacitor 58 and one terminal of capacitor 60 is connected to ground. The values of resistor 59 and capacitor 60 are selected so that the filter has a relatively short time constant enabling it to transmit or pass the pulse train having the ten millisecond pulse durations, which pulse train is illustrated by the wave form designated A in the drawing and corresponds to the first radio frequency signal generated by transmitter 40.

Connected to the output of this first signal transmission path is a time delay means comprising the series combination of a capacitor 61 and a resistor 62. One terminal of capacitor 61 is connected to capacitor 60 and one terminal of resistor 62 is connected to ground. A time delayed signal is developed across resistor 62 and is applied by a resistor 63 to the oscillator portion of pulse generator 10. In particular, one terminal of resistor 63 is connected to the junction of capacitor 61 and resistor 62 and the other terminal of resistor 63 is connected through a lead 64 to the junction of resistor 14 and capacitor 15 which comprise the timing means for pulse generator 10, which junction also is connected to the base terminal of oscillator transistor 13. A resistor 65 is connected across the combination of resistor 57 and capacitor 58, i.e. between the anode of diode 55 and the grounded terminal of capacitor 58, to provide a resistive discharge path across capacitors 58 and 60.

The second signal transmission path of detector 54 similarly includes a diode rectifier 70, the anode of which is connected through a lead 71 to lead 53 and the cathode of which is connected to one terminal of a resistor 72. The other terminal of resistor 72 is connected to one terminal of a capacitor 73, the other terminal of which is connected to ground. Diode 70, resistor 72 and capacitor 73 comprise a conventional diode detector, and the output voltage thereof appears across the combination of resistor 72 and capacitor 73. This path also includes a filter comprising the series combination of a resistor 75 and a capacitor 76. One terminal of resistor 75 is connected to the junction of capacitor 73 and resistor 72 and the other terminal of capacitor 76 is connected to ground. The values of resistor 75 and capacitor 76 are selected so that the filter has a relatively long time constant, that is, sufficiently long so as to transmit or pass both the pulsating signal indicated at B in the drawing and the continuous or carrier wave signal indicated at C. These signals correspond to the second and third signals, respectively, from transmitter 40. The signal appearing across capacitor 76 is a d.c. level and the junction of resistor 75 and capacitor 76 is connected through a lead 77 and a resistor 78 to the base terminal of transistor 25 included in the control means or signal responsive means of pulse generator 10. This signal transmission path finally includes a time delay means comprising the series combination of a capacitor 79 and a resistor 80. One terminal of capacitor 79 is connected to the junction of resistor 75 and capacitor 76 and the other terminal of resistor 80 is connected to ground. The time delayed output signal appearing across resistor 80 is transmitted or connected through a resistor 81 to lead 64 and, hence, to the junction of resistor 14 and capacitor 15 which comprise the timing means for pulse generator 10, which junction also is connected to the base terminal of oscillator transistor 13.

The apparatus of the present invention operates in the following manner. When it is desired to increase the rate at which pulses are generated by the means 10, switch 42 is moved to a position engaging terminal A on modulator 41 and the pulse train of relatively short bursts or radio frequency energy are radiated from antenna 45 and received by antenna 51. This signal is rectified by the combination of diode 55, resistor 57, and capacitor 58. A filtered and delayed command signal shown at 85 appears across resistor 62 and is applied to the junction of resistor 14 and capacitor 15 and, hence, to the base terminal of transistor 13. The command signal shown at 85 can be termed a trigger signal. The network including resistor 59, capacitors 60 and 61, and resistor 62 provides a very short time constant which operates off the leading edge of the pulse envelope to drive the base terminal of transistor 13 positively over the threshold level so as to fire pulse generating means 10. In other words, the repetition rate of pulses transmitted from transmitter 40 will serve to increase the rate of pulse generation above the natural free-running rate of generator 10 if the external controller is set at a rate faster than the rate determined by timing means 14, 15.

When it is desired to decrease the rate of pulse generation, switch 42 is moved to a position engaging modulator output terminal B. In this mode of operation a pulse train is generated but of a longer envelope. Preferably the pulses each have a duration of from about 100 to about 500 milliseconds, the exact duration being determined by the setting of potentiometer 46. The radio frequency signal comprising the pulse train is radiated from antenna 45 and received at loop antenna 51. This signal, having a relatively larger envelope duration, is transmitted through the second path of detector 54 which has a relatively larger time constant. The signal is rectified, filtered and delayed as it passes through the elements 70-80, and the time delayed command signal appears across resistor 80 and has a wave form as indicated at 86. The command signal shown at 86 can be termed a delay signal. When applied to the base terminal of oscillator transistor 13, delay signal 86 results in not only firing of the pulse generator 10 but also holding of the base terminal at ground thereby preventing recharging until this delay pulse 86 has ended. Simultaneous application of the positive trigger signal 85 and the negative delay signal 86 is prevented by the long time constant of filter 79, 80. As a result, the interval of pulses generated by means 10 is effectively lengthened by about 100–500 milliseconds. In the case of a demand cardiac pacer, this results in lowering of the stimulated heart rate from 90 beats per minute (667 milliseconds) to about 50 beats per minute (667 plus 500 ms equals 1167 ms). This mode of operation should include a time constant of about 1 to 2 seconds to permit grounding of the base terminal of oscillator transistor 13 to increase the output pulse interval.

When it is desired to test the operation of pulse generator 10 in the mode of operation controlled by the portion including amplifier 25, switch 42 is moved to a position engaging output terminal C of modulator 41. A continuously varying or carrier wave signal is radiated from transmitter 40 at antenna 45 and the signal received at antenna 51 is rectified by the combination of diode 70, resistor 72 and capacitor 73. The rectified signal is transmitted through the filter comprising resistor 75 and capacitor 76 and appears on line 77 as a d.c. voltage or command signal indicated at 87 which can be termed an inhibit signal. This d.c. voltage or inhibit signal is, in turn, applied to the base terminal of transistor 25 and is sufficiently negative to bias transistor 25 to a cutoff condition. As a result, the operation of the circuit including transistor 25 is inhibited whereby oscillator transistor 13 produces output pulses at the free-running rate determined by resistor 14 and capacitor 15. The absence of any change in the free-running rate is an indication of satisfactory performance.

This test mode of operation is of particular significance when pulse generator 10 is an implanted pacer of the demand type. An accurate measurement of the free-running rate can be made without surgical intervention and can be compared with a similar measurement made at an later date. If no deviation is seen, this would assure the clinician that no gross degradation in pacer performance has developed since the pateint's last visit. A change in the free running rate on the other hand, is universely recognized as an indication of pacer degradation and a signal that replacement of the pacer should be considered. The time constant of the circuit should be relatively long for this mode of operation, for example, a 2 to 5 second time constant would be sufficient to introduce a free-running mode.

The remotely-operated control of the present invention thus enables changing of the rate and function mode of a remote pulse generator by radiating from a remote transmitter radio frequency signals having different envelope durations. A circuit in conjunction with the pulse generator provides command signals in the form of trigger, delay and inhibit signals corresponding to which of the particular radio frequency signals is received. The trigger and delay signals cause an increase or decrease, respectively, in the rate of pulse generation and the inhibit signal provides a change in the function mode of operation. The invention is advantageously applicable to an implantable cardiac pacer of the demand type wherein the rate of stimulating pulses is changed by the duration and repetition rate of the controller pulse envelope and where the function mode is changed by radiating a carrier wave or continuously varying signal. Control means 50 of the present invention can be implanted in the body of the patient with the pacer and operated externally of the body by transmitter 40. In this connection, control means 50 would be encased in a suitable enveloping material such as that employed for implanted cardiac pacers.

Figure 2:
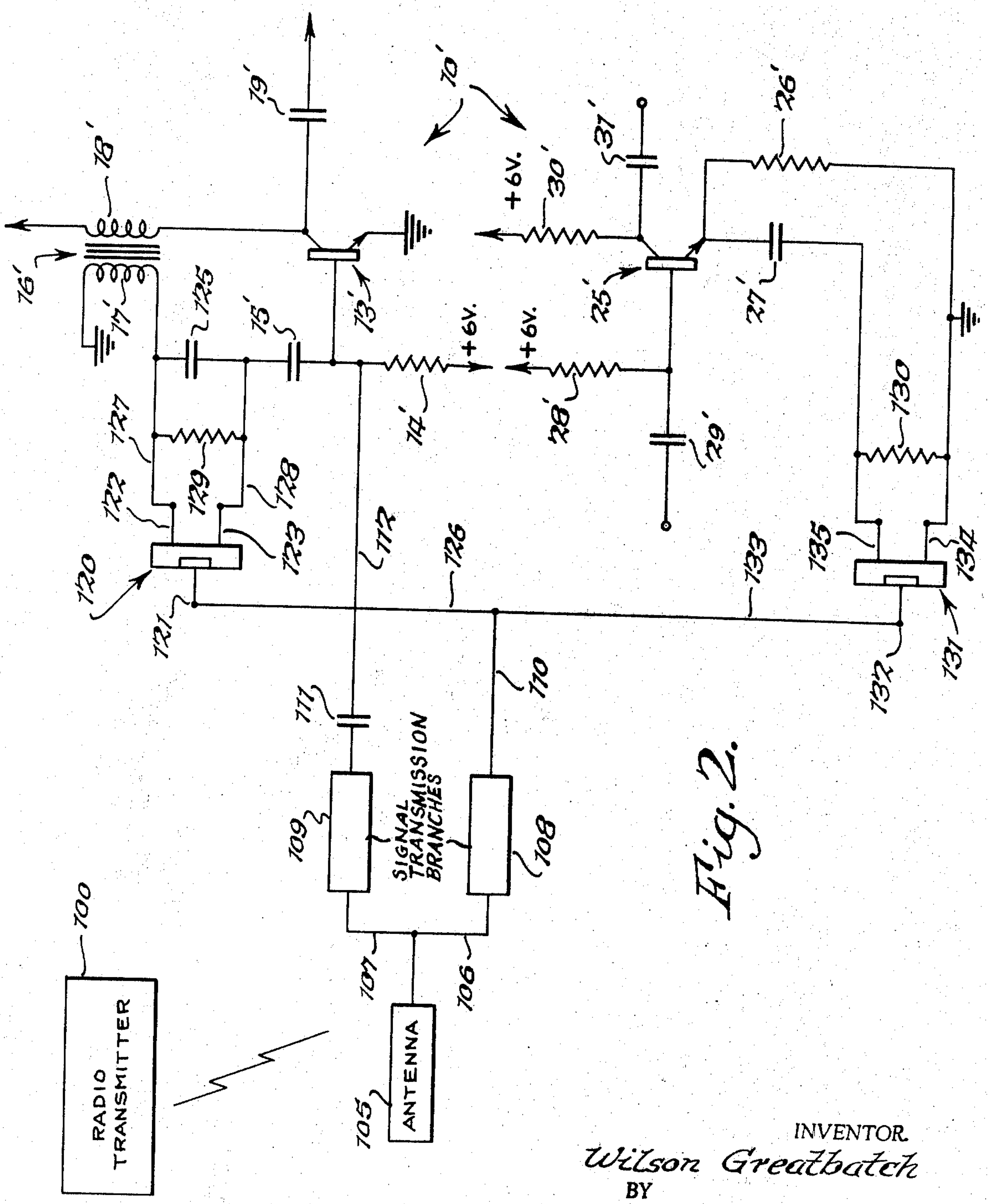

FIG. 2 shows a remotely-operated control for an artificial cardiac pacer according to a second embodiment of the present invention. A pulse generator to be controlled is indicated generally at 10′ in FIG. 2 and according to a preferred mode of the present invention comprises a cardiac pacer of the demand type. Pacer 10′ shown in FIG. 2 is substantially identical in construction and operation to pacer 10 shown in FIG. 1, and for convenience in description the identical components are labeled with identical numbers having a prime superscript. The remote control of this embodiment of the invention includes a remote radio transmitter 100 which can be identical to transmitter 40 shown in FIG. 1. Transmitter 100 operates at power levels sufficiently high so that no conceivable outside radio frequency interference could possible conflict with normal pacer operation or interrogation. In addition, a relatively sharp frequency selectivity is employed, so that radio frequency signals outside the selected band width of transmitter 100 will not affect the system. The radio frequency signals radiated from transmitter 100 will have essentially two forms, one a continuous or carrier wave signal, and the other a pulsating signal in the form of envelopes of r.f. energy of relatively short duration.

The control means coupled to pacer 10′ includes an antenna 105 which can comprise a radio frequency pickup coil similar to coil 51 in FIG. 1. The output of antenna 105 is applied through leads 106 and 107 to corresponding inputs of signal transmission branches 108 and 109, respectively. Branch 108 is responsive to only the continuous or carrier wave signal, and includes circuit elements for filtering and rectifying the signal in a manner similar to the signal processing performed by the branches in FIG. 1. The output of branch 108 is available on line 110 in the form of a d.c. voltage level or command signal, which is utilized to test the stimulation safety margin and R-wave sensitivity safety factor of pacer 10′ in a manner which will be described in detail presently.

Branch 109 is responsive to only the pulsating signals and rectifies and filters the signals in a manner similar to the operation of branch 108. The output of branch 109 comprises a command signal which is coupled through a capacitor 111 and a lead 112 to the base terminal of oscillator transistor 13' at the junction of resistor 14' and capacitor 15'. The inclusion of capacitor 111 insures that the d.c. component of the rectified signal is removed so that only relatively square trigger pulses corresponding to envelope changes appear on lead 112 and are applied to oscillator transistor 13'. As a result, the pacer oscillator is prematurely triggered into firing at a relatively faster stimulation rate and in a 1:1 relationship with the pulse repetition rate of the signal from transmitter 100. In other words, the pulsating form of signal radiated from transmitter 100 will comprise envelopes of relatively short duration, preferably under about 10 milliseconds, which are repeated at intervals corresponding to the desired increased heart rate. It is apparent, of course, that another branch could be included and capacitively coupled to base terminal of oscillator transistor 13 for decreasing the rate of generation of stimulating pulses in response to a pulstating signal of relatively longer envelope duration as in the embodiment of FIG. 1.

The d.c. voltage level or command signal appearing on line 110 in response to reception of the continuous or carrier wave signal is utilized to operate means for reducing the width of the stimulating pulses and, hence, the energy thereof produced by pacer 10' to test the stimulation safety margin. In preferred form, the means for reducing the stimulating pulse width includes a semiconductor switch in the form of field effect transistor 120 having base, source and drain terminals 121–123, respectively, and a capacitor 125 connected in series between capacitor 15' and winding 17' of transformer 16'. Transistor switch 120 is connected in controlled relation to the output of branch 108, in particular, transistor base terminal 121 is connected through a lead 126 to lead 110. Transistor switch 120 is connected in controlling relation to capacitor 125, in particular leads 127 and 128 connect the source and drain terminals 127 and 128 of transistor 120 in parallel with capacitor 125. An isolating resistor 129 can be included across the terminals 127, 128 of transistor switch 120.

In response to the presence of a d.c. voltage level or command signal on line 110, transistor 120 is rendered non-conducting thereby removing the short circuit from capacitor 125 and effectively reducing the capacitive portion of the timing means for pacer 10'. The relative magnitudes of capacitor 15' and 125 are selected to provide a reduction in the pacer pulse width by a factor of about 30 percent when transistor 120 is rendered conducting. If the patient still follows the pacer at this reduced energy pulse level, it may safely be assumed that an adequate safety margin exists and that pacer replacement can be deferred pending another such examination. In other words, the pacer battery and electrode condition can be assumed adequate. For a more detailed description of the construction and operation of a circuit wherein the capacitive portion of the timing means is reduced in response to the operation of a semiconductor switch reference can be made to my issued U.S. Pat. No. 3,618,615, issued Nov. 9, 1971 and entitled SELF-CHECKING CARDIAC PACEMAKER.

The stimulation safety margin of a pacer such as that indicated at 10' can be tested with a high degree of precision and control as a result of the stimulating pulse energy reduction by means of pulse width reduction. The fact that such testing can be initiated and controlled externally of the body, i.e. by transmitter 100, of course obviates the need to perform any surgery on the patient.

The d.c. voltage level or command signal appearing on line 110 also can be utilized to detect whether an adequate R-wave sensitivity safety margin remains. According to a preferred mode of the present invention this is accomplished by reducing the gain of the R-wave amplifier in the demand pacer and observing the patient's response to that reduction. Referring to FIG. 2, the gain of amplifier 25' is reduced in the present instance by increasing the magnitude of the impedance in the output circuit thereof. To this end, a resistor 130 is connected in series between capacitor 27' and ground. A semiconductor switching means in the form of field effect transistor 131 is connected in controlled relation to the output of branch 108 and in controlling relation to resistor 130. In particular, base terminal 132 of transistor 131 is connected through a lead 133 to lead 110. The source and drain terminals 134 and 135, respectively, of transistor 131 are connected in parallel with resistor 130.

In the absence of a signal on line 110, transistor 131 is conducting, placing a short circuit across resistor 130. When the continuous or carrier wave signal is radiated from transmitter 100, resulting in a d.c. voltage level or command signal on line 110, transistor 131 is turned off thereby adding resistor 130 in series with capacitor 27', degeneratively decreasing the gain of amplifier 25'. The gain of the R-wave amplifier of pacer 10' accordingly is reduced.

Thus, in response to the generation of a continuous carrier wave signal from transmitter 100, it can be determined whether pacer 10' has an adequate stimulation safety margin and an adequate R-wave sensitivity safety margin. If the stimulation safety margin is inadequate, the patient will not respond to the reduced energy stimulating pulses. If the R-wave sensitivity safety margin is inadequate, the patient would revert to an ideoventricular mode and escape from the demand mode.

As in the embodiment of FIG. 1, the control means shown in FIG. 2 can be implanted in the body of the patient with the pacer and operated externally of the body by transmitter 100, in which case the control means would be encased in a suitable enveloping material such as that employed for implanted cardiac pacers.

It is therefore apparent that the present invention accomplishes its intended objects. The remotely-operated control of the present invention can be used advantageously in conjunction with an implanted cardiac pacer of the demand type to temporarily accelerate or decelerate the rate of pulse generation and to permit a determination of whether the pacer is working properly in the demand mode. In addition, a determination can be made whether the pacer has an adequate stimulation safety margin and an adequate R-wave sensitivity safety factor. All this can be done in a manner obviating the need for surgical intervention. While several specific embodiments of the present invention have been described in detail, this has been done by way of illustration without thought of limitation.

I claim:

1. A remotely-operated control for an electrical pulse generating means of the type including an oscillator portion providing output pulses at a free-running rate and control means operatively connected to said oscillator portion for causing generation of output pulses at a different rate, said remotely-operated control comprising:

a. a remote transmitter for selectively generating a plurality of radio frequency signals having different envelope durations, said transmitter including means for producing said radio frequency signals comprising two pulsating signals of relatively short envelope duration with one pulsating signal having a shorter envelope duration that the other pulsating signal and a continuous signal of longest envelope duration;

b. means coupled to said pulse generating means and responsive to said radio frequency signals for producing corresponding command signals;

c. said signal responsive means including means for applying one of said command signals corresponding to one of said pulsating signals to said oscillator portion, said one command signal being a trigger signal having a duration increasing the rate of output pulse generation of said oscillator portion relative to said free-running rate;

d. said signal responsive means further including means for applying a second one of said command signals corresponding to the other of said pulsating signals to said oscillator portion, said second one of said command signals being a delay signal of duration for decreasing the rate of output pulse generation of said oscillator portion relative to said free-running rate; and e. said signal responsive means further including means for applying the third of said command signals corresponding to said continuous signal to said control means, said third of said command signals being an inhibit signal and rendering said control means inoperative for the duration of said signal so that the rate of output pulse generation is at said free-running rate.

2. Apparatus according to claim 1 wherein said signal responsive means comprises:

a. antenna means for receiving said signals;

b. detecting means including first and second signal transmission paths, said first path allowing transmission of the pulsating signal having the shorter envelope duration and said second path allowing transmission of the other pulsating signal and the continuous signal having the longest envelope duration; and c. filtering means and time delay means in each of said paths.

3. A remotely-operated control for an electrical pulse generator of the type including an oscillator for providing output pulses and capacitive timing means connected to said oscillator for controlling the generation of said pulses, said remotely-operated control comprising:

a. a remote transmitter for selectively generating a plurality of radio frequency signals having different envelope durations, the signal of longest envelope duration being a continuous, carrier wave signal;

b. signal responsive means coupled to said pulse generator for producing corresponding command signals in response to reception of said radio frequency signals;

c. semiconductor switching means connected in controlling relation to said timing means for modifying said timing means in a manner reducing the width of output pulses from said generator;

d. said signal responsive means including means for applying the command signal generated in response to said continuous radio frequency signal in controlling relation to said semiconductor switching means;

e. said semiconductor switching means being connected in parallel with a portion of the capacitance in said timing means, whereby said capacitance is reduced in response to said continuous radio frequency signal; and f. said signal responsive means including further means for applying a command signal generated in response to another radio frequency signal in controlling relation to said oscillator to change the rate of output pulses from said oscillator.

4. Apparatus according to claim 3 wherein said pulse generator further includes control means including an amplifier having an output circuit with resistance included therein and connected to said timing means for causing generation of output pulses at a different rate and wherein said remotely-operated control further comprises:

a. another semiconductor switching means connected in controlling relation to said amplifier for reducing the gain of said amplifier; and b. said signal responsive means further including means for applying the command signal generated in response to said continuous radio frequency signal in controlling relation to said another switching means.

5. Apparatus according to claim 4 wherein said another semiconductor switching means is connected in parallel with a portion of the resistance in the output circuit of said amplifier whereby the amplifier gain is degeneratively decreased in response to said continuous radio frequency signal.

6. Apparatus according to claim 3 wherein said another signal generated by said transmitter is pulsating and wherein said further means of said signal responsive means applies the command signal generated in response to the pulsating signal to said pulse generator oscillator for increasing the rate of output pulse generation.

* * * * *